(12) United States Patent
Tezza, II et al.

(10) Patent No.: US 11,884,200 B2
(45) Date of Patent: Jan. 30, 2024

(54) MODULAR POP-UP SEMI-DRY BATHROOM

(71) Applicants: Peter J. Tezza, II, Oxnard, CA (US);
Jean-Thierry Aupetit, Oxnard, CA (US)

(72) Inventors: Peter J. Tezza, II, Oxnard, CA (US);
Jean-Thierry Aupetit, Oxnard, CA (US)

( * ) Notice: Subject to any disclaimer, the term of this patent is extended or adjusted under 35 U.S.C. 154(b) by 0 days.

(21) Appl. No.: 17/850,993

(22) Filed: Jun. 27, 2022

(65) Prior Publication Data

US 2022/0410791 A1    Dec. 29, 2022

Related U.S. Application Data

(60) Provisional application No. 63/215,524, filed on Jun. 28, 2021.

(51) Int. Cl.
*B60P 3/34* (2006.01)
*B60R 15/04* (2006.01)

(52) U.S. Cl.
CPC ............... *B60P 3/34* (2013.01); *B60R 15/04* (2013.01)

(58) Field of Classification Search
CPC ............. B60P 3/34; B60R 15/04; B60R 15/02

USPC ................ 4/605, 596, 610; 49/381
See application file for complete search history.

(56) References Cited

U.S. PATENT DOCUMENTS

| | | | |
|---|---|---|---|
| 5,379,466 A | 1/1995 | Davies | |
| 5,673,962 A | 10/1997 | Maieli | |
| 7,117,646 B2 | 10/2006 | Blaisdell | |
| 9,199,701 B2 | 12/2015 | Sahr | |
| 10,232,806 B1 * | 3/2019 | Feher | B60P 3/34 |
| 11,089,912 B2 | 8/2021 | Talada | |
| 11,357,361 B1 | 6/2022 | Wright | |
| 2022/0324370 A1 * | 10/2022 | King | B60P 3/34 |

FOREIGN PATENT DOCUMENTS

| | | | | |
|---|---|---|---|---|
| AU | 2020101516 A4 | * | 9/2020 | |
| CN | 215254891 U | * | 12/2021 | |
| CN | 218355164 U | * | 1/2023 | B60P 3/34 |
| EP | 2236359 | | 10/2010 | |

* cited by examiner

*Primary Examiner* — Lori L Baker
(74) *Attorney, Agent, or Firm* — David Michie

(57) ABSTRACT

A slide-up bathroom for a vehicle that have the following characteristic: telescopic walls that allow an upper section of the slide-up bathroom to move up and down relative to a lower section of the slide-up bathroom; and a toilet storage container for the toilet to move in and out thereof and into a main interior of the slide-up bathroom.

9 Claims, 7 Drawing Sheets

MODULAR POP-UP SEMI-DRY BATHROOM

CROSS-REFERENCE TO RELATED APPLICATIONS

This application is a non-provisional of, and claims the benefit of priority from, U.S. Provisional Patent Application No. 63/215,524 filed Jun. 28, 2021.

FEDERALLY SPONSORED RESEARCH

Not Applicable

FIELD OF INVENTION

This invention relates to a modular slide-up bathroom for a vehicle, more particularly, to a modular slide-up bathroom that includes a hard wall shower and toilet for vehicles such as vans, camper vans, and recreational vehicles (RVs).

BACKGROUND

Portable housing units and vehicles such as vans, camper vans, and Recreational Vehicles (RVs), often have interior bathrooms with showers and toilets. Due to the limited space inside said structures and vehicles, there is a need to have a compact and flexible solution for having a shower and toilet inside said structures or vehicles.

Existing bathroom designs have the following drawbacks: they have either fixed walls or curtain walls. Additionally, fixed wall designed bathrooms means the physical space occupied by the bathroom cannot be used for other purposes when the bathroom is not in use. Fixed walled bathrooms may also block views and make a small space feel even more confined. Fixed Wall bathrooms are not modular and cannot be installed and uninstalled to change the vehicle's configuration for a particular use.

With respect to curtain wall showers, curtain walls have less privacy than wall made of hard sided materials. Curtain walls are prone to leaking water when showering. And, curtain walls tend to billow and/or stick to a person while showering, which is an undesirable user experience.

Other issues that occur with a typical "web bath," a combined shower and toilet unit, are that the toilet may become wet while showering and that the toilet requires additional floorspace to accommodate both the toilet and a standing person while showering.

There is also a need for a slide-up bathroom that provides a decrease floor space and interior cubic volume in the vehicle that also allows for customization depending on a user's needs.

BRIEF SUMMARY OF THE INVENTION

A slide-up bathroom for a vehicle has the following characteristic: telescopic walls that allow an upper section of the slide-up bathroom to move up and down relative to a lower section of the slide-up bathroom; and a toilet storage container for the toilet to move in and out thereof and into a main interior of the slide-up bathroom.

Wherein the lower section of the slide-up bathroom has an aperture that allows the toilet to be moved in and out of both the interior slide-up bathroom and the toilet storage container. In some embodiments, the aperture has at least one of a door, a flap, and a curtain.

The slide-up bathroom including the toilet storage container are modular and readily movable from the vehicle so as to allow a user to customize said vehicle depending on their needs.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art.

Figure 1:
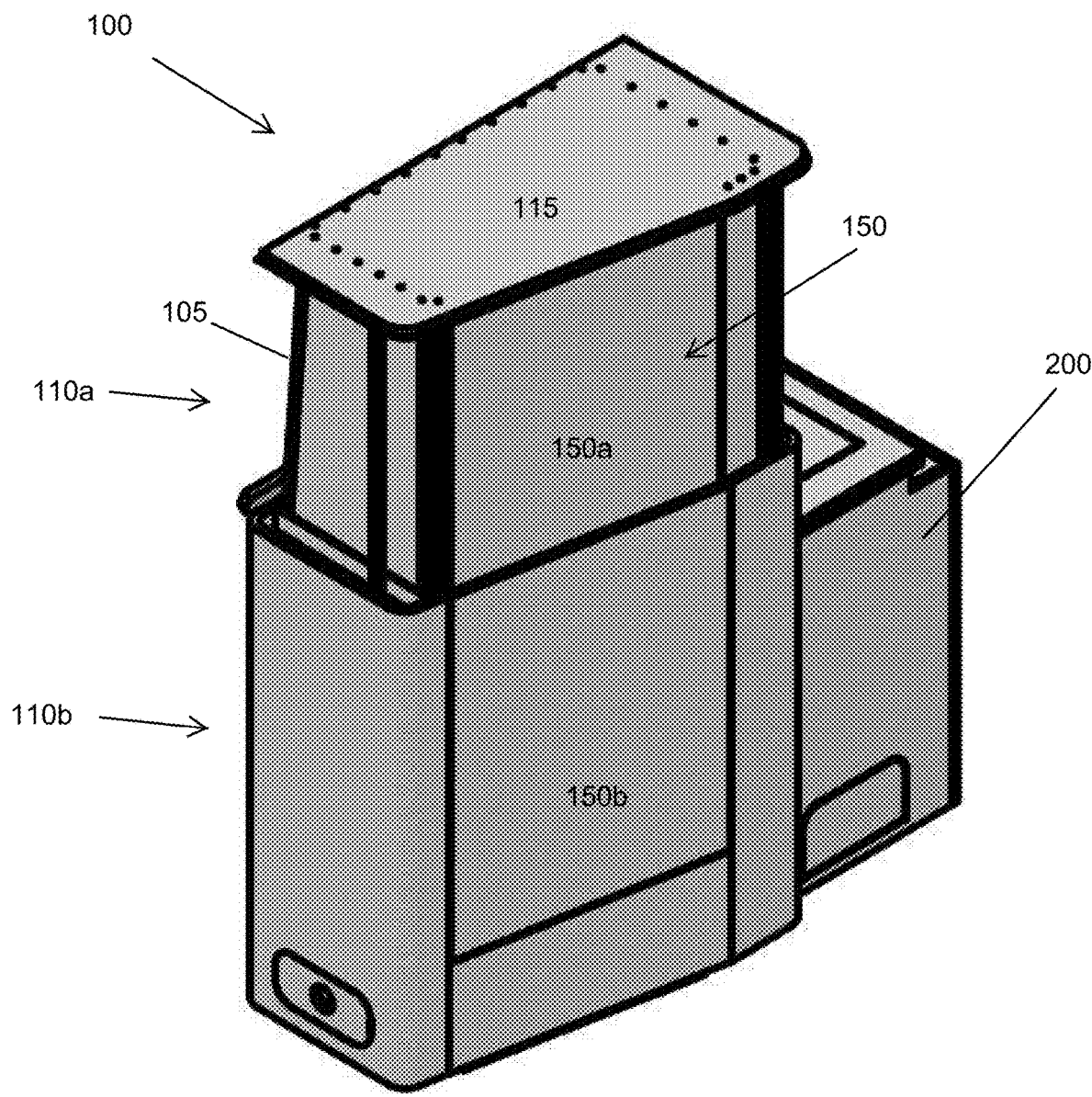
FIG. 1 is an isometric view of a slide-up bathroom in an open position.
Figures 2A, 2B:
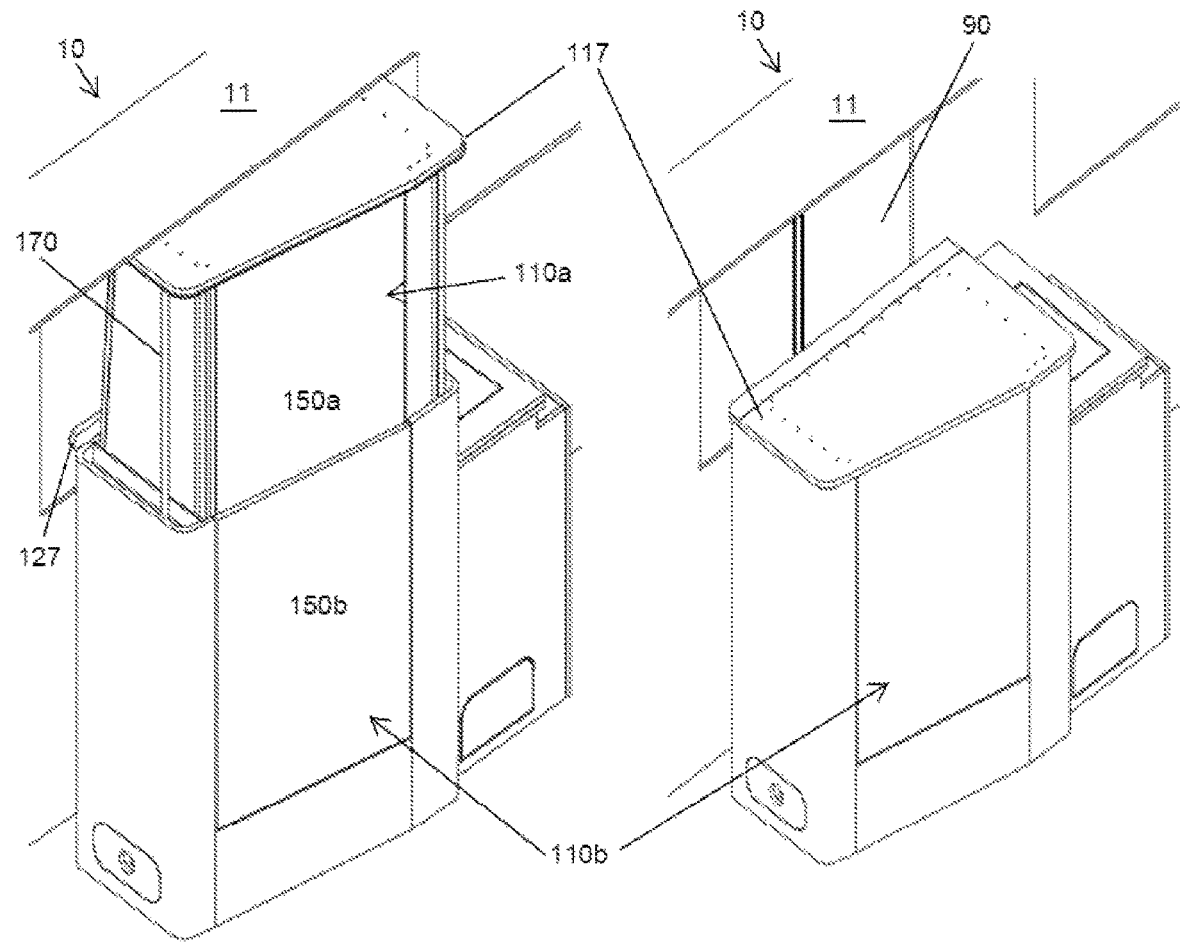
FIG. 2A is a perspective view of the slide-up bathroom in the open position inside a vehicle.
FIG. 2B is a perspective view of the slide-up bathroom in a closed position inside a vehicle.
Figure 3:
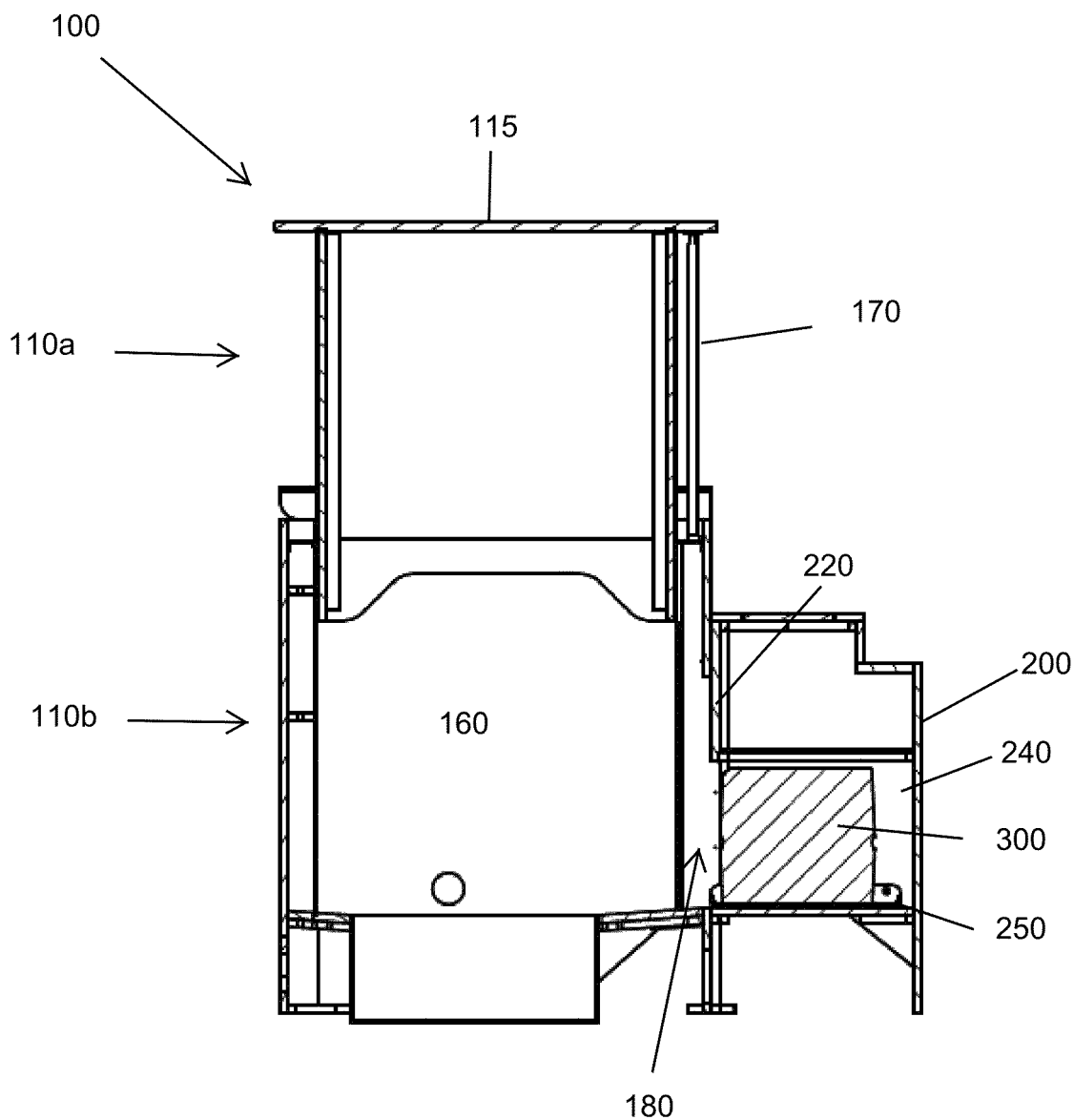
FIG. 3 is a front sectional view of the slide-up bathroom and a toilet storage container in the open position and a toilet recessed.

In most embodiments, as seen in FIGS. 1-3, a slide-up bathroom 100 for a structure or vehicle 10 has the following characteristic: telescopic walls 105 that allow an upper section 110a of the slide-up bathroom 100 to move up and down relative to a lower section 110b of the slide-up bathroom 100; and a toilet storage area 200 for the toilet 300 to move in and out thereof.

In most embodiments, the telescopic walls 105 that make up the slide-up bathroom 100 may have the upper section 110a and the lower section 110b that may be made from at least one material comprising of a metal, a plastic, a resin, a wood, a glass, or a combination thereof. In most embodiments, the upper section 110a of the slide-up bathroom 100 and the lower section 110b of the slide-up bathroom 100 may be made of the same at material or may be made of different materials.

In most embodiments, the upper section 110a of the slide-up bathroom 100 may be moved up into an open position to a full height that allows a user to stand up right. In some embodiments, the full height may be to a ceiling 11 of a structure or vehicle 10. In most embodiments, the upper section 110a of the slide-up bathroom 100 may be raised up or down with a lifting mechanism 170. In other embodiments, the full height of the slide-up bathroom 100 may be set by the user not to exceed a desired size requirement using the lifting mechanism 170, such as a pushpin with at least one height selected hole. In another embodiment, the upper section 110a of the slide-up bathroom 100 may be moved the lifting mechanism 170 that is automated, such as a piston or any type of linear servo motor, i.e., rotating, hydraulic, electrical magnetic, etc. In some embodiments, the upper section 110a and the lower section 110b of the slide-up bathroom 100 may be separated by at least one of a flange, a gasket, a gutter, etc., so as to prevent water from leaking out of the slide-up bathroom 100.

Figure 4:
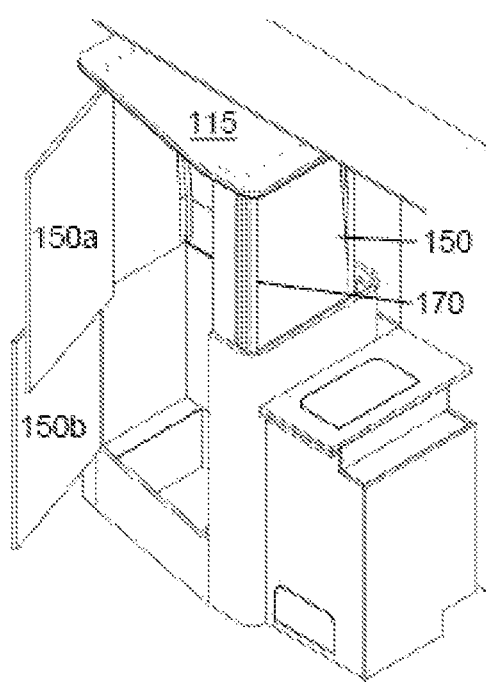
FIG. 4 is a perspective view of a shower door of the slide-up bathroom in an open position.

In most embodiments, as seen in FIGS. 1 and 4, a door 150 to the slide-up bathroom 100 may have an upper door section 150a and a lower door section 150b. The upper door section 150a and the lower door section 150b may move along in a telescopic manner with the slide-up bathroom 100 when the upper section 110a of the slide-up bathroom 100 may be moved in either the up or down direction. In some embodiments, the upper door section 150a and lower door section 150b may have a guide track so as allow both upper and lower door sections 150a, 150b to stay aligned when the door 150 may be in an open position and in a closed position. In some embodiments, both upper and lower door sections 150a, 150b may have independent mechanical latching or locking systems so that each of the upper and lower door sections 150a, 150b may be opened independently. In some embodiments, the upper door section 150a may have a door window to allow natural light. In some embodiments, the upper door section 150a may have a vent to allow steam out of the slide-up bathroom 100.

In most embodiments, when the upper section 110a may be moved down to a closed position to recover physical space when the slide-up bathroom 100 is not in use. In some embodiments, when the slide-up bathroom 100 is not in use, or the upper section 110a of the slide-up bathroom 100 is in the down position, a window 90 in the structure or vehicle 10 may be revealed for viewing. In all embodiments, when the upper section 110a of the slide-up bathroom 100 is in the down position, the interior of the structure or vehicle 10 will have additional interior volume, thus giving the user a more open feel within the structure or vehicle 10. In some embodiments, when the upper section 110a of the slide-up bathroom 100 is down, a top 115 of the upper section 110a of the slide-up bathroom 100 may be a countertop 117. Said countertop 117 on the upper section 110a of the slide-up bathroom 100 may be a standalone countertop or may be a continuous countertop that may match adjacent countertops within the structure or vehicle 10. In some embodiments, as seen in FIGS. 1, 2A, and 2B, the lower section 110b of the slide-up bathroom 100 may have a tiltable countertop portion 127 that may match the countertop 117. In this embodiment, the tiltable countertop portion 127 may increase usable countertop surfaces in the structure or vehicle 10, while the countertop 117 may have a smaller area or foot-print to conform with a curving ceiling of the structure or vehicle 10.

In some embodiments, the walls 105 of the upper section may have a wall window 106 that may correspond to the window 90 so as to allow natural light into the slide-up bathroom 100. In some embodiments, the walls 105 of the upper section 110a may have the vent positioned next to the window 90 so as to allow steam to escape the slide-up bathroom 100. In some embodiments, the walls 105 of the upper section 110a may have a fan positioned next to the window 90 so as to force air out of the slide-up bathroom 100 through an open window 90.

In some embodiments, when the upper section 110a of the slide-up bathroom 100 is in the down position, the top 115 of the upper section 110a of the slide-up bathroom 100 may be a storage unit 118 (not shown) capable of storing personal items. In a few embodiments, the top 115 of the upper section 110a of the slide-up bathroom 100 may be a television stand 119 (not shown). In some embodiments, when the upper section 110a of the slide-up bathroom 100 is in an up position, a television on the television stand 119 on the top 115 of the upper section 110a of the slide-up bathroom 100 may be stored in an upper space, such as a cabinet, an interior structure or vehicle space, a ceiling recess, etc.

In another embodiment, the television stand 119 may be a pivotal television stand that holds a television that may be capable of rotating from a vertical position when the upper section 110a of the slide-up bathroom 100 is in the down position to a horizontal position when the upper section 110a of the slide-up bathroom 100 is in the up position, which may allow the television to be store in a compact or flat state between the top 115 of the upper section 110a of the slide-up bathroom 100 and the upper space, such as a cabinet, an interior structure or vehicle space, a ceiling recess, etc.

Figure 5:
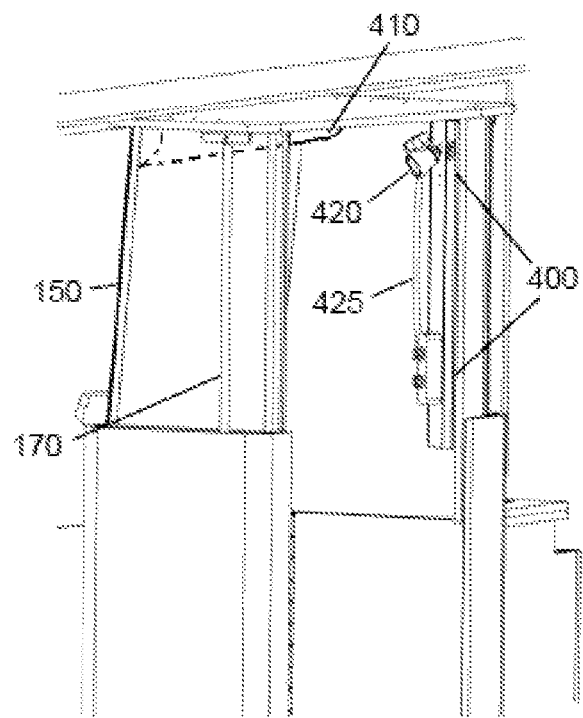
FIG. 5 is a perspective view of a shower fixture and a lighting fixture attached to an interior of the slide-up bathroom.

In most embodiments, as seen in FIG. 5, the slide-up bathroom 100 may have at least one fixture 400, such as a light 410, a shower head 420, and a shower hose 425. In most embodiments, the at least one fixture 400 may be removable. In some embodiments, the light 410 may be integral with the upper section of the slide-up bathroom 100. In some embodiments, the shower head 420 may be attached to a wall 105 of the upper section 110a of the slide-up bathroom 100. In some embodiments, the shower hose 425 may be attached to the lower section 110b or the upper section 110a of the slide-up bathroom 100. In most embodiments, the shower head 420 may be attached to the shower hose 425. In most embodiments, plumbing tubes 450 (not shown) may be attached to an outer surface of the slide-up bathroom 100 and may be flexible tubes that may be able to move with the upper section 110a of the slide-up bathroom 100.

In most embodiments, as seen in FIGS. 1, 3, and 6-8, the toilet 300 may move in and out of a main bathroom space 160 into a toilet storage container 200. In some embodiments, the toilet 300 may slide along the floor connecting the slide-up bathroom 100 and the toilet storage container 200. In this embodiment, the floor may have grooves so as to allow the toilet 300 to only side in one direction. In most embodiments, the toilet 300 may move on a sliding shelf 250 that may be pushed or pulled into and out of the toilet storage container 200. In some embodiments, the sliding shelf 250 may be moved automatically using at least one of an electric motor, a mechanical lever, a piston, etc.

In some embodiments, an interior volume 240 of the toilet storage container 200 may be connected to a lower section 110b of the slide-up bathroom 100 via an aperture 180 on at least one side of the lower section 110b of the slide-up bathroom 100. In most embodiments, the toilet 300 may move into the interior volume 240 of the toilet storage container 200 through the aperture 180 far enough to keep the toilet 300 dry while showering within the main bathroom space. By using the toilet storage container 200 attached to the slide-up bathroom 100, the overall volume dedicated to the slide-up bathroom 100 may be reduced.

Figure 6:
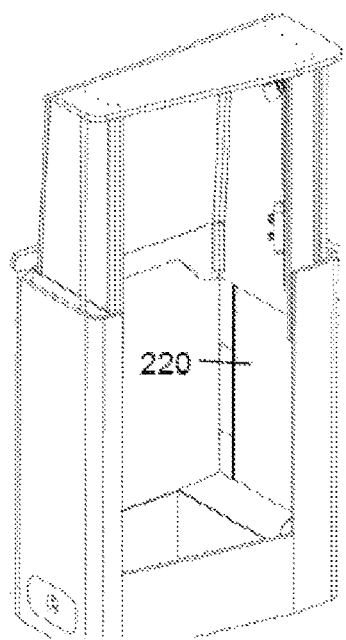
FIG. 6 is a perspective view of a door for a toilet storage container in a closed position.
Figure 7:
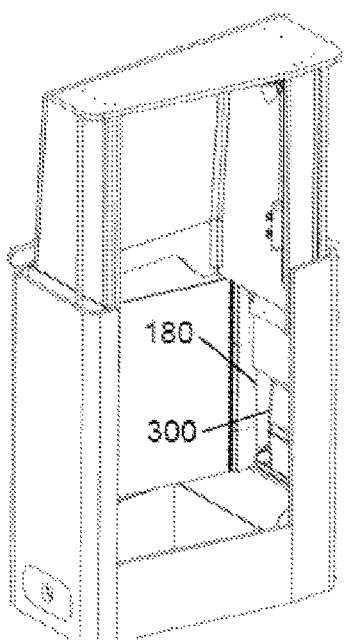
FIG. 7 is a perspective view of the toilet storage container in an open position with a toilet in a recessed position.
Figure 8:
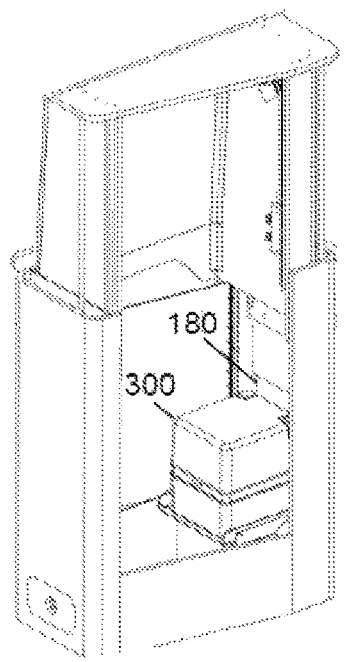
FIG. 8 is a perspective view of the slide-up shower with the toilet in a usable position
Figure 9A:
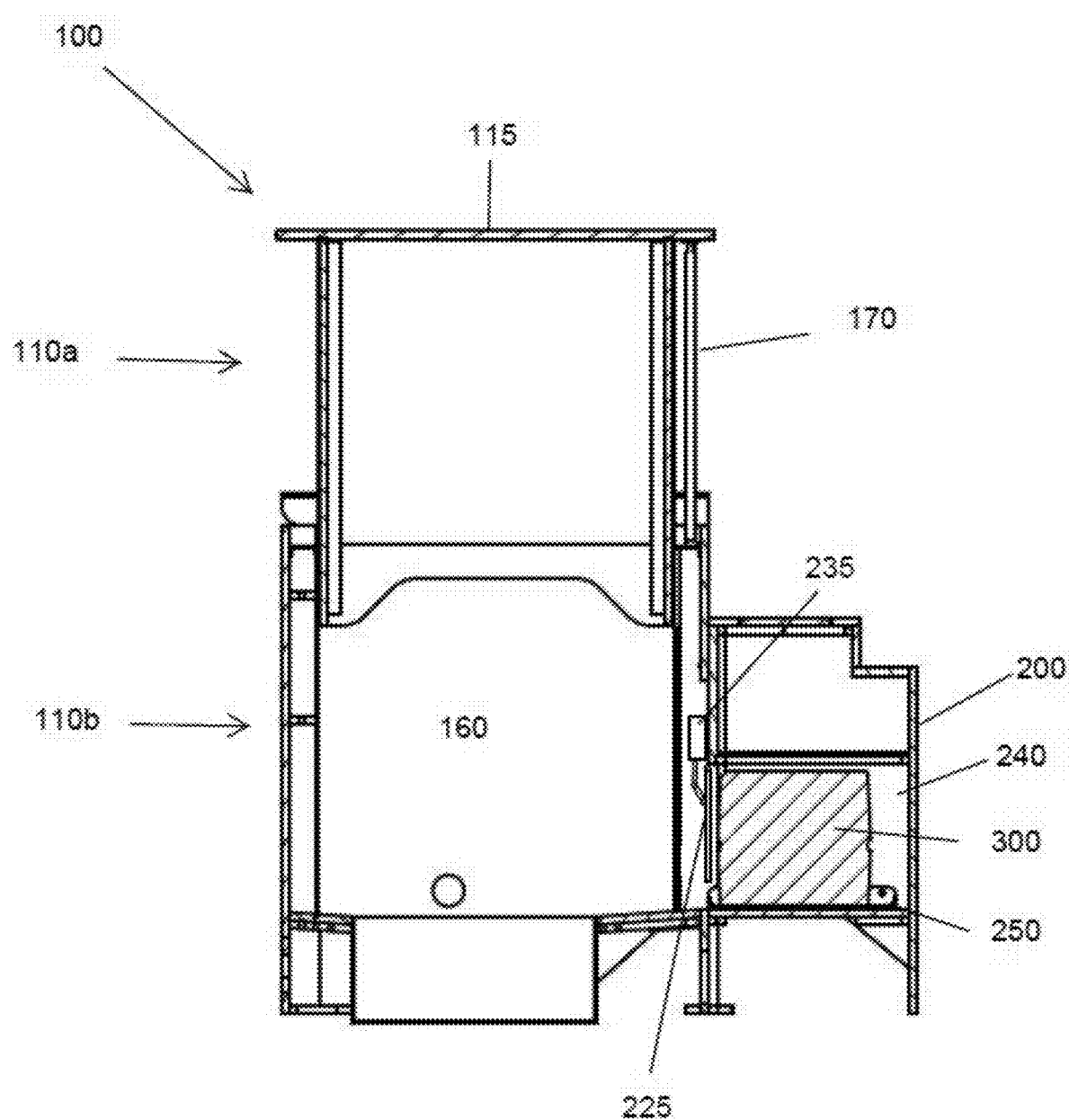
FIG. 9A is a front sectional view of the slide-up bathroom and a toilet storage container showing a flap.
Figure 9B:
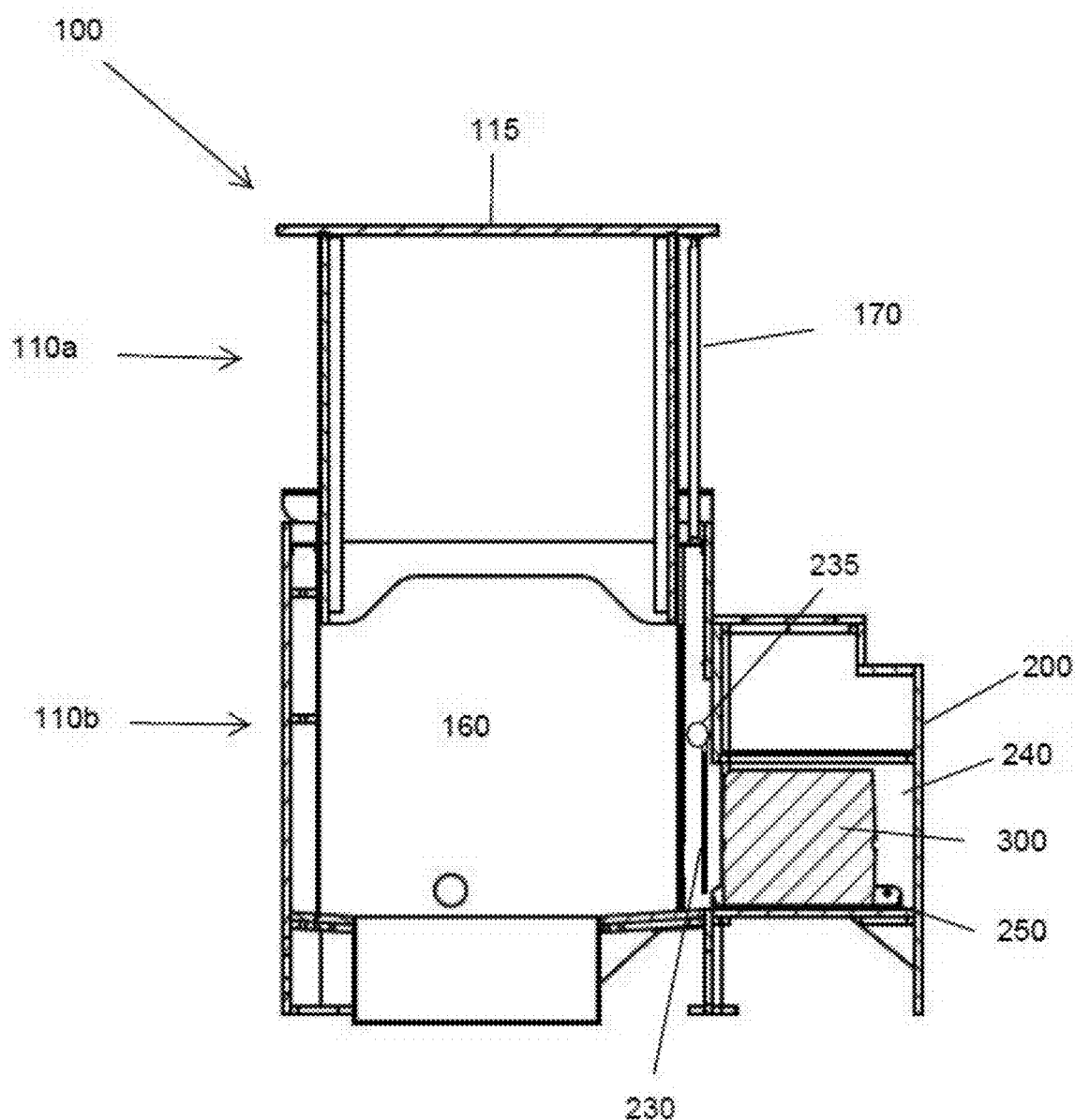
FIG. 9B is a front section view of the slide-up bathroom and a toilet storage container showing a curtain.

In another embodiment, the aperture 180 may be covered by at least one of a door 220 (as seen in FIG. 6), a flap 225, and a curtain 230. It should be understood that the flap 225 and the curtain 230 may be an option replacement for the door 220. The at least one door 220, the flap 225, and the curtain 230 may be moved or opened so as to allow the toilet 300 to be moved into the toilet storage container 200. In some embodiments, the at least one of the door 220, the flap 225, and the curtain 230 may lock in a closed position via at least one of a mechanical lock, at least one magnet, and at least one suction cup. This may prevent the toilet 300 from moving into or out of the toilet storage container 200. In most embodiments, the at least one of the door 220, the flap 225, and the curtain 230 may be moved manually or automatically using an opening and closing device 235 comprising at least one of an electric motor, a mechanical lever, a piston, a linear actuator, etc. In most embodiments, the at least one of the door 220, the flap 225, and the curtain 230 may reduce water from the shower contacting the toilet 300 within the toilet storage container 200, thus keeping a "semi-dry" bathroom.

In some embodiments, the toilet storage container 200 may fit underneath at least one of a couch, a bed, a cabinet, etc. In some embodiments, the toilet storage container 200 may be removable from the slide-up bathroom 100. In most embodiments, the toilet storage container 200 may be fastened to the slide-up bathroom 100 via at least one locking devices such as bolts and nuts (including wing nuts), mechanical locks, clamps, wedges, etc. In one embodiment, the toilet storage container 200 and the lower section 110b of the slide-up bathroom 100 may be integrally constructed.

In most embodiments, the slide-up bathroom 100 and the toilet storage container 200 may be made of any strong and relatively lightweight material or the at least one material listed above. In most embodiments, the slide-up bathroom 100 and the toilet storage container 200 may be removable from the structure or vehicle 10, in most cases by two adults. By using a removable slide-up bathroom 100 and toilet storage container 200, the user may be able to easily install and uninstall the removable slide-up bathroom 100 and toilet storage container 200 as desired by the owner.

In most embodiments, standard maintenance of the slide-up bathroom 100 may be completed with standard tools known by one reasonably skilled in the art. In most embodiments, the slide-up bathroom 100 and associated parts may be attached to other parts or to the vehicle 10 with fasteners, which may be any fastener known by one reasonably skilled in the art. In some embodiments, the slide-up bathroom 100 and associated parts may be attached by permanent fasteners, such as rivets, welding, and adhesives, or a combination of permanent and non-permanent fasteners.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

The invention claimed is:

1. A slide-up bathroom for a vehicle, the slide-up bathroom comprising:
    an upper section comprising of a plurality of upper walls;
    a lower section comprising:
        a plurality of lower walls;
        an aperture;
        a toilet storage container, wherein the toilet storage container that holds a toilet;
        a ceiling;
        a floor;
    wherein the upper section is telescoped into the lower section;
    wherein the toilet is movable into and out of the lower section of the slide-up bathroom and into and out of the toilet storage container;
    wherein the upper section moves up into an open position; and
    wherein the upper section moves down into a closed position.

2. The slide-up bathroom of claim 1, wherein the aperture has at least one of a door, a flap, and a curtain; wherein the of the door, the flap, and the curtain prevent water or toilet from entering the toilet storage container.

3. The slide-up bathroom of claim 2, wherein the at least one of the door, the flap, and the curtain are lockable.

4. The slide-up bathroom of claim 3, wherein the at least one of the door, the flap, and the curtain are automatically moved using an opening and closing device comprising at least one of an electric motor, a mechanical lever, a piston, a linear actuator.

5. The slide-up bathroom of claim 1, wherein the toilet sits on a slidable shelf that is able to slide between the lower section of the slide-up bathroom and the toilet storage container.

6. The vehicle slide-up of claim 1, wherein the toilet storage container is removable from the slide-up bathroom.

7. The slide-up of claim 1, wherein a countertop is affixed to a top of the upper section; wherein the top is opposite of the ceiling of the upper section.

8. The slide-up bathroom of claim 1, wherein the upper section is raised and lowered with a lifting mechanism.

9. The slide-up bathroom of claim 1, further comprising:
    an upper bathroom door in the upper section;
    a lower bathroom door in the lower section;
    wherein the upper bathroom door is moveable along with the upper section.

* * * * *